US010051028B1

United States Patent
Armitage et al.

(10) Patent No.: US 10,051,028 B1
(45) Date of Patent: Aug. 14, 2018

(54) SCHEDULING DOWNLOADS BASED ON METADATA IN A CLIENT-SERVER TOPOLOGY

(71) Applicant: International Business Machines Corporation, Armonk, NY (US)

(72) Inventors: Joshua H. Armitage, Ellenbrook (AU); Michael P. Clarke, Ellenbrook (AU); John A. W. Kaputin, Rockingham (AU); King-Yan Kwan, Perth (AU); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/864,083

(22) Filed: Jan. 8, 2018

Related U.S. Application Data

(63) Continuation of application No. 15/702,103, filed on Sep. 12, 2017, now Pat. No. 9,930,087, which is a continuation of application No. 15/433,076, filed on Feb. 15, 2017.

(51) Int. Cl.
*H04L 29/08* (2006.01)
*H04L 29/06* (2006.01)

(52) U.S. Cl.
CPC ............ *H04L 65/602* (2013.01); *H04L 67/06* (2013.01); *H04L 67/32* (2013.01); *H04L 67/42* (2013.01)

(58) Field of Classification Search
CPC ....................................................... H04L 67/32
USPC ....................................................... 709/219
See application file for complete search history.

(56) References Cited

U.S. PATENT DOCUMENTS

| | | |
|---|---|---|
| 2002/0198963 A1 | 12/2002 | Wu et al. |
| 2003/0005452 A1 | 1/2003 | Rodriguez |
| 2005/0018695 A1 | 1/2005 | Ramaswamy et al. |
| 2012/0216182 A1 | 8/2012 | Ronning et al. |
| 2015/0256619 A1 | 9/2015 | Mihaly et al. |
| 2016/0316388 A1 | 10/2016 | Rosen et al. |

(Continued)

FOREIGN PATENT DOCUMENTS

| | | |
|---|---|---|
| WO | 03052608 A1 | 6/2003 |
| WO | 2005098674 A1 | 10/2005 |

OTHER PUBLICATIONS

Adler et al. "Optimal Peer Selection for P2P Downloading and Streaming". Proceedings IEEE INFOCOM 2005. 24th Annual Joint Conference of the IEEE Computer and Communications Societies, Mar. 13-17, 2005. Copyright IEEE. pp. 1538-1549.

(Continued)

*Primary Examiner* — Adnan Mirza
(74) *Attorney, Agent, or Firm* — Edward P. Li

(57) ABSTRACT

A computer program product for scheduling downloads based on metadata in a client-server topology. A server receives from a client application a request for scheduling a download of a file, wherein the request for scheduling the download of the file comprises a requirement of a time period for downloading the file. The server fetches information from one or more metadata sources. The server determines an optimal time for downloading the file, based on the requirement of the time period and information from one or more metadata sources. The server sends a response with the optimal time and information for downloading the file. The server receives from the client a request for downloading the file at the optimal time. The server serves, at the optimal time, the file to the client application.

1 Claim, 3 Drawing Sheets

(56) References Cited

U.S. PATENT DOCUMENTS

2017/0180960 A1    6/2017    Drake et al.

OTHER PUBLICATIONS

Huchesnet. "How to Schedule Downloads for Off-peak Hours". HughesNet Internet Resources, Accessed on Dec. 20, 2016. Three pages. "http://internet.hughesnet.com/faqs/schedule-downloads/>.

Appendix P List of Patents or Applications Treated as Related Dated Jan. 8, 2018. Two pages.

Armitage et al. Original U.S. Appl. No. 15/433,076, filed Feb. 15, 2017.

Armitage et al. Original U.S. Appl. No. 15/702,103, filed Sep. 12, 2017.

Armitage et al. Original U.S. Appl. No. 15/864,132, filed Jan. 8, 2018.

SCHEDULING DOWNLOADS BASED ON METADATA IN A CLIENT-SERVER TOPOLOGY

BACKGROUND

The present invention relates generally to downloading files from servers, and more particularly to scheduling downloads based on metadata in a client-server topology.

Currently, there is no mechanism for scheduling future downloads based on a combination of client requirements and costs. A download schedule is either defined wholly by a client or a server, and there is no mediation that occurs between the parties; this results in less optimal scheduling downloads. However, there are a range of possible options that fulfil needs of the client but have different cost/benefit ratios to the service provider.

Download schedulers are used in peer-to-peer (P2P) file sharing, which is the distribution and sharing of digital media using peer-to-peer (P2P) networking technology. There exist methodologies for scheduling downloads in peer-to-peer topologies; however, the methodologies are not translatable to a client-server architecture. Forward caching of resources is a different method to reduce server load in times of high traffic. Forward caching of resources reduces server load by offloading as opposed to smoothing the usage across a wider time period, and it is more geared towards immediacy and accidental denial of service as opposed to lowering the strain across servers over protracted periods of time.

SUMMARY

A computer program product for scheduling downloads based on metadata in a client-server topology is provided. The computer program product comprises a computer readable storage medium having program code embodied therewith. The program code is executable to receive from a client application, by a server, a request for scheduling a download of a file, wherein the request for scheduling the download of the file comprises a requirement of a time period for downloading the file. The program code is further executable to fetch, by the server, information from one or more metadata sources, wherein the information is relevant to the request for scheduling the download of the file. The program code is further executable to determine, by the server, an optimal time for downloading the file, based on the requirement of the time period and information from one or more metadata sources. The program code is further executable to send to the client application, by the server, a response with the optimal time and information for downloading the file, wherein the information for downloading the file comprises a token for authentication, wherein the token is used to provide mapping between the request for scheduling the download of the file and the request for downloading the file at the optimal time. The program code is further executable to receive from the client, by the server, a request for downloading the file at the optimal time. The program code is further executable to receive from the client application, by the server, the token. The program code is further executable to serve, by the server, at the optimal time, the file to the client application. The program code is further executable to reschedule, by the client application, the download of the file, in response to the requirement of the time period being changed after the client application has sent to the server the request for downloading the file at the optimal time. The program code is further executable to cancel, by the client application, the download of the file, in response to the download of the file not being needed after the client application has sent to the server the request for downloading the file at the optimal time. The information from one or more metadata resources comprises one or more of historical server load statistics, Internet service provider data caps, peak and off-peak times for client network traffic, costs to the client, routing, and bandwidth.

DETAILED DESCRIPTION

Embodiments of the present invention use metadata sources to make informed decisions and present cost savings to clients whilst serving the needs of the business and providing content that clients need. For example, scheduling downloads uses metadata about peak/off-peak times for client network traffic; in a case that the data is not needed immediately (e.g. pre-loading a video), a download is scheduled at the time when the download has minimal cost to the client. There are no constraints on what metadata can be used to make the scheduling decisions. The metadata is directly from the client and from metadata sources or metadata stores. What metadata will be used is defined by the business. The embodiments of the present invention can be implemented in different systems, support programs, and runtime environments; for example, a most likely common solution is REST (Representational State Transfer) over HTTP (Hypertext Transfer Protocol) based API (Application Program Interface).

Figure 1:
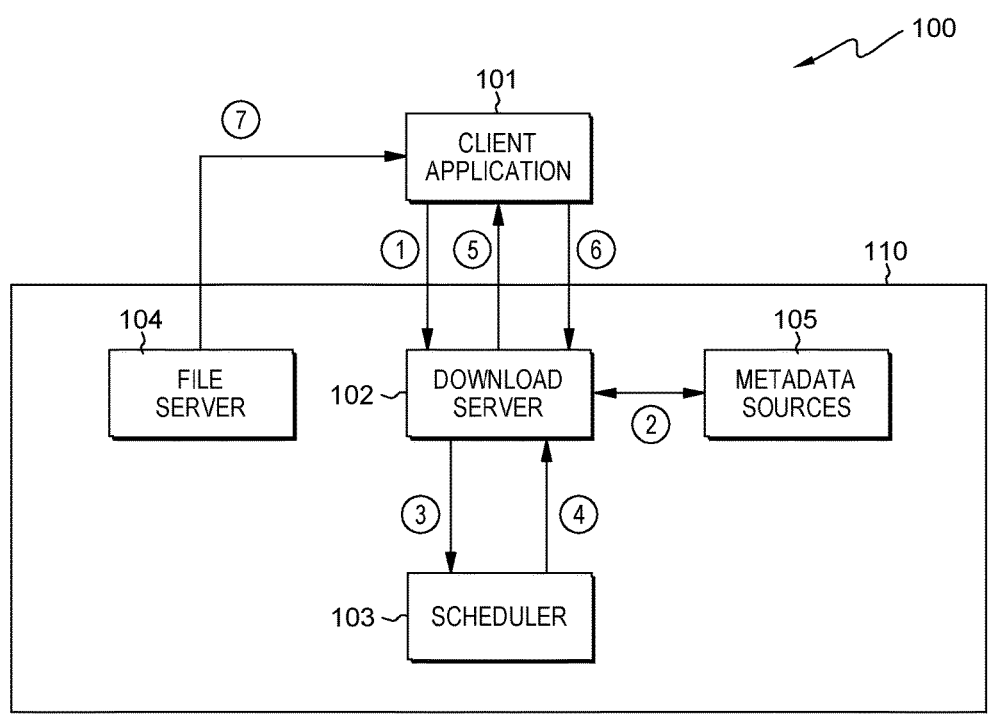
FIG. 1 is a diagram illustrating a system for scheduling downloads based on metadata in a client-server topology, in accordance with one embodiment of the present invention.

FIG. 1 is a diagram illustrating system 100 for scheduling downloads based on metadata in a client-server topology, in accordance with one embodiment of the present invention. System 100 is a client-server topology, comprising client application 101 and server 110. Server 110 comprises download server 102, scheduler 103, file server 104, and metadata sources 105.

Referring to FIG. 1, as denoted by ①, client application 101 sends to download server 102 a request for scheduling a download. The request for scheduling the download specifies a file that a client wants to download. The request for scheduling the download comprises a requirement of a time period for downloading the file and a latest time point at which the file should be downloaded. The request for scheduling the download may include other information to inform server 110 such that server 110 can make a decision more in line with the client wishes. The requirement of the time period for downloading the file and the other information included in the request for scheduling the download are metadata from the client side and will be used for making decision by server 110.

Referring to FIG. 1, as denoted by ②, in response to receiving the request for scheduling the download from client application 101, download server 102 fetches information (or metadata) from metadata sources 105 (or one or more metadata stores). The information from metadata sources 105 comprises historical server load statistics, ISP (Internet service provider) data caps, peak/off-peak times for client network traffic, costs to the client, routing, bandwidth, and other needed information. For the current request, download server 102 fetches from metadata sources 105 information (or metadata) which is relevant to the current request.

Referring to FIG. 1, as denoted by ③, download server 102 forwards to scheduler 103 the request for scheduling the download of the file and the fetched information (or metadata). When the request is forwarded, all information included in the request, such as the time period for downloading the file and the latest time point at which the file should be downloaded, is forwarded to scheduler 103 by download server 102.

Scheduler 103 determines an optimal time for downloading the file, based on the information included in the request for scheduling the download of the file and the information (or metadata) fetched from metadata sources 105. Referring to FIG. 1, as denoted by ④, in response to determining the optimal time for downloading the file, scheduler 103 sends to download server 102 the optimal time for downloading the file.

Referring to FIG. 1, as denoted by ⑤, download server 102 sends to client application 101 a response with the optimal time for downloading the file. In the response to client application 101, download server 102 provides client application 101 with information the client needs or has been requested. The information includes the location of file server 104 and a token that authenticates the client for downloading the file at the optimal time.

Referring to FIG. 1, as denoted by ⑥, in response to receiving the response from download server 102, client application 101 sends a request for downloading the file at the optimal time and the token for authentication if required. Thus, downloading the file at the optimal time is initiated by client application 101. After the initiation, if the requirement of the time period for downloading the file is changed, client application 101 may reschedule for downloading the file. After the initiation, if downloading the file is not needed anymore, client application 101 may cancel downloading the file at the optimal time. As denoted ⑦, file server 104 serves the file to client application 101 at the optimal time.

The token for authentication is used to provide a mapping between the client request for scheduling the download of the file and the request for downloading the file at the optimal time. Thus, server 110 makes sure the client makes the download request in line with what has been agreed.

Figure 2:
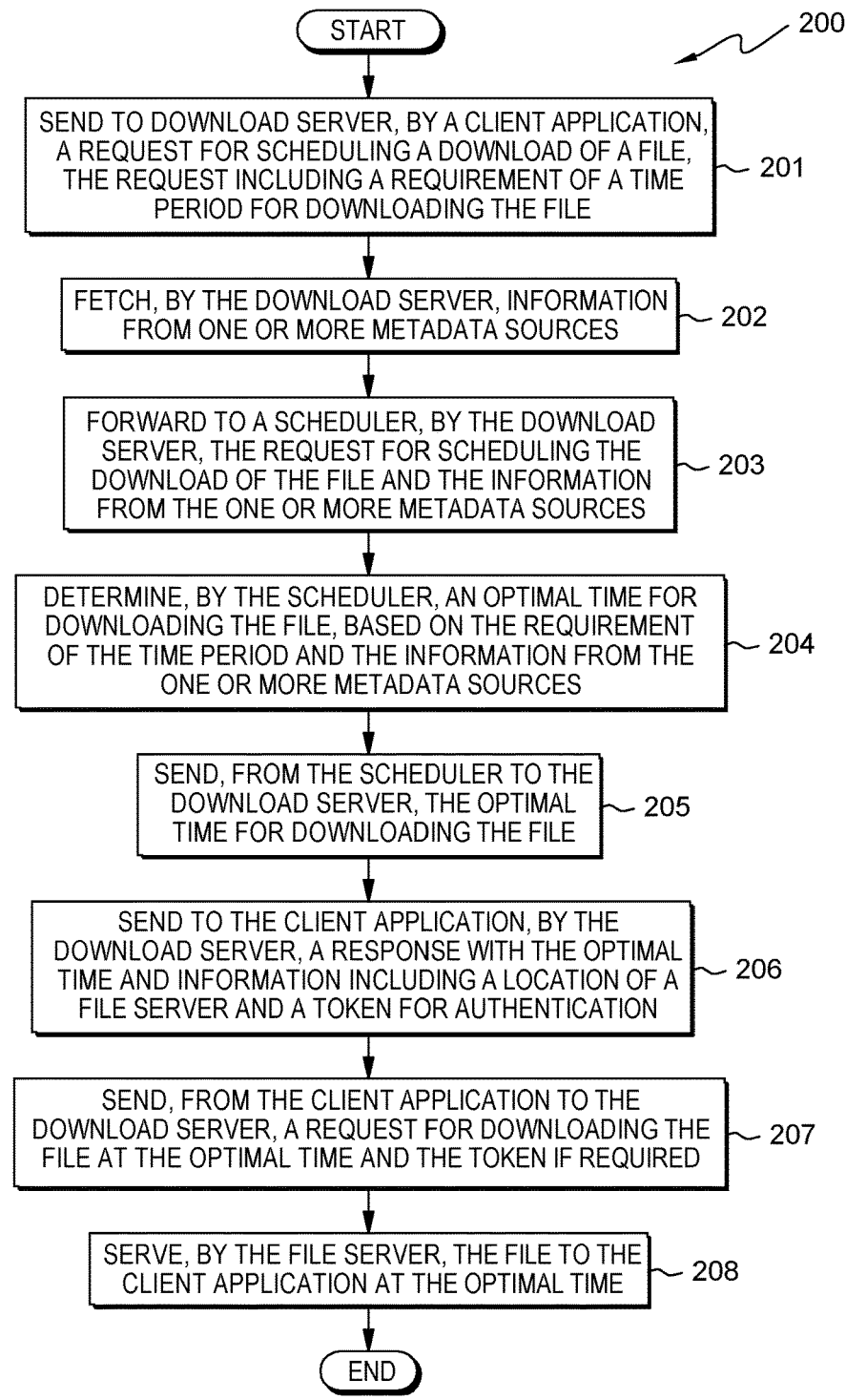
FIG. 2 is a flowchart showing operational steps for scheduling downloads based on metadata in a client-server topology, in accordance with one embodiment of the present invention.

FIG. 2 is flowchart 200 showing operational steps for scheduling downloads based on metadata in a client-server topology, in accordance with one embodiment of the present invention. At step 201, client application 101 sends to download server 102 a request for scheduling a download of a file. The request specifies the file that the client wants to downloaded. The request comprises a requirement of a time period for downloading the file. The time period sets a time point at which the file should be downloaded. The request also includes other information for server 110 to make a decision more in line with the client wishes. The requirement of the time period for downloading the file and the other information included in the request for scheduling the download of the file are metadata from the client side.

At step 202, in response to receiving from client application 101 the request for scheduling the download of the file, download server 102 fetches information (or metadata) from metadata sources 105. Metadata sources 105 store information including historical server load statistics, ISP (Internet service provider) data caps, peak/off-peak times for client network traffic, costs to the client, routing, bandwidth, and other needed information. Download server 102 fetches some of the information (or metadata) specifically relevant to the current request.

At step 203, download server 102 forwards to scheduler 103 the request for scheduling the download of the file and the fetched information (or metadata) at step 202. The information included in the request for scheduling the download of the file, such as the time period for downloading the file and the latest time point at which the file should be downloaded, is forwarded to scheduler 103.

At step 204, scheduler 103 determines an optimal time for downloading the file, based on the information (e.g., requirement of the time period for downloading the file) included in the request sent at step 201 by client application 101 and the information (or metadata) fetched from metadata sources 105 at step 202. In response to determining the optimal time for downloading the file, at step 205, scheduler 103 sends to download server 102 the optimal time for downloading the file.

In response to receiving the optimal time determined by scheduler 103, at step 206, download server 102 sends client application 101 a response with the optimal time for downloading the file and information for downloading the file. The information for downloading the file includes, for example, a location of file server 104 and a token for authentication. The token for authentication is used to provide a mapping between the client request for scheduling the download of the file and a request for downloading the file at the optimal time. The request for downloading the file at the optimal time will be made by client application 101 at the next step (step 207). Thus, server 110 makes sure the client makes the download request in line with what has been agreed.

In response to receiving a response from download server 102 at step 206, client application 101, at step 207, sends download server 102 a request for downloading the file at the optimal time and the token for the authentication. Thus, downloading the file at the optimal time is initiated by client application 101. If the requirement of the time period for downloading the file is changed, client application 101 may reschedule for downloading the file. If downloading the file is not needed anymore, client application 101 may cancel downloading the file at the optimal time.

If client application 101 does not reschedule or cancel the initiated download of the file at the optimal time, at step 208, file server 104 serves the file to client application 101 at the optimal time which is determined at step 204.

Figure 3:
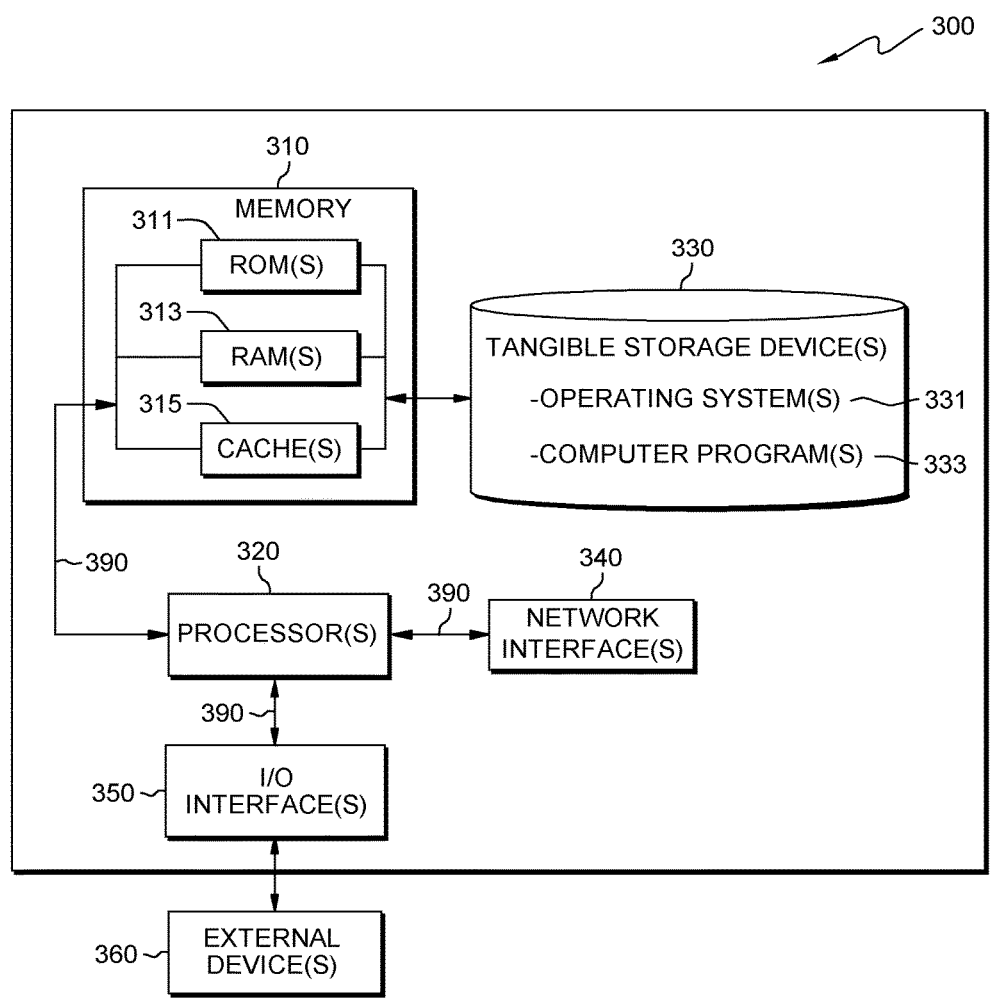
FIG. 3 is a diagram illustrating components of a computer device of a client or a server for scheduling downloads based on metadata in a client-server topology, in accordance with one embodiment of the present invention.

FIG. 3 is a diagram illustrating components of computer device 300 hosting client application 101 or server 110 for scheduling downloads based on metadata in a client-server topology, in accordance with one embodiment of the present invention. It should be appreciated that FIG. 3 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 3, computer device 300 includes processor(s) 320, memory 310, and tangible storage device(s) 330. In FIG. 3, communications among the above-mentioned components of computer device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. On a client computer, client application 101 resides on one or more computer readable tangible storage device(s) 330. On a server computer, download server 102, scheduler 103, file server 104, and metadata sources 105 reside one or more computer readable tangible storage device(s) 330. Alternatively, download server 102, scheduler 103, file server 104, or metadata sources 105 may reside on a separate computer device connected to the server computer via a network. Computer device 300 further includes I/O interface(s) 350. I/O interface(s) 350 allows for input and output of data with external device(s) 360 that may be connected to computer device 300. Computer device 300 further includes network interface(s) 340 for communications between computer device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for scheduling downloads based on metadata in a client-server topology, the computer program product comprising a non-transitory computer readable storage medium having program code embodied therewith, the program code executable to:

receive from a client application, by a server device, a request for scheduling a download of a file, wherein the request for scheduling the download of the file comprises a requirement of a time period for downloading the file;

fetch, by the server device, information from one or more metadata sources, wherein the information is relevant to the request for scheduling the download of the file;

determine, by the server device, an optimal time for downloading the file, based on the requirement of the time period and information from one or more metadata sources;

send to the client application, by the server device, a response with the optimal time and information for downloading the file, wherein the information for downloading the file comprises a token for authentication, wherein the token is used to provide mapping between the request for scheduling the download of the file and the request for downloading the file at the optimal time;

receive from the client application, by the server device, a request for downloading the file at the optimal time;

receive from the client application, by the server device, the token;

serve, by the server device, at the optimal time, the file to the client application;

reschedule, by the client application, the download of the file, in response to the requirement of the time period being changed after the client application has sent to the server device the request for downloading the file at the optimal time;

cancel, by the client application, the download of the file, in response to the download of the file not being needed after the client application has sent to the server device the request for downloading the file at the optimal time; and wherein the information from one or more metadata resources comprises one or more of historical server load statistics, Internet service provider data caps, peak and off-peak times for client network traffic, costs to the client, routing, and bandwidth.

* * * * *